United States Patent [19]

Schulze

[11] Patent Number: 5,040,366
[45] Date of Patent: Aug. 20, 1991

[54] FLUID TRANSFER DEVICE

[75] Inventor: Wallace M. Schulze, West Chester, Ohio

[73] Assignee: General Electric Company, Cincinnati, Ohio

[21] Appl. No.: 296,241

[22] Filed: Jan. 13, 1989

[51] Int. Cl.$^5$ .............................................. F02C 7/06
[52] U.S. Cl. .................................. 60/39.08; 184/6.11
[58] Field of Search ..................... 60/39.08; 184/6.11, 184/6.3, 6.4; 137/544, 545, 563, 568; 417/540

[56] References Cited

U.S. PATENT DOCUMENTS

| | | | |
|---|---|---|---|
| 2,804,241 | 8/1957 | McDowall et al. | 60/39.281 |
| 3,827,236 | 8/1974 | Rust | 184/6.11 |
| 4,012,012 | 3/1977 | Ligler | 244/1 R |
| 4,153,141 | 5/1979 | Methlie | 60/39.08 |
| 4,215,719 | 8/1980 | Laar et al. | 137/563 |
| 4,377,374 | 3/1983 | Taylor | 184/6.3 |
| 4,389,984 | 6/1983 | Destrampe | 123/196 |
| 4,390,082 | 6/1983 | Swearingen | 184/6.11 |
| 4,444,292 | 4/1984 | Brown et al. | 184/6.4 |
| 4,511,016 | 4/1985 | Döell | 184/6.11 |
| 4,531,358 | 7/1985 | Smith | 60/39.08 |
| 4,623,455 | 11/1986 | Adcock | 210/168 |
| 4,717,000 | 1/1988 | Waddington et al. | 60/39.08 |

Primary Examiner—Louis J. Casaregola
Attorney, Agent, or Firm—Jerome C. Squillaro; Charles L. Moore, Jr.

[57] ABSTRACT

The present invention provides a device for transferring replacement fluid from a first to a second fluid system and for transferring overflow fluid from the second fluid system to the first fluid system. Replacement and overflow fluid is transferred between systems by first and second flow paths respectively, each flow path including a filter to prevent particle contamination between the systems.

18 Claims, 2 Drawing Sheets

FLUID TRANSFER DEVICE

The invention relates to a device for transferring fluid between two fluid systems.

BACKGROUND OF THE INVENTION

The auxiliary oil system of an aircraft gas turbine engine is a closed circuit fluid system that circulates oil through the integrated-drive generator system of the engine as well as oil-air and oil-fuel heat exchangers. Like other closed circuit systems, the auxiliary oil system normally experiences a lack of oil consumption. Consequently, service checks are generally made infrequently and then primarily to determine whether there has been an oil depletion. The failure to frequently service such a closed circuit fluid system can lead to the creation of sludge, a deterioration in the fluid, e.g., an increase in oil acidity, or fluid depletion due to leakage or vapor loss, among other problems. Furthermore, these problems can be exacerbated as the operating temperature regime of the closed circuit system increases.

Engine subsystems serviced by the auxiliary oil system, such as the integrated-drive generator, may be adversely affected by the above-recited problems. As a result, such subsystems may fail over a period of many hours of service use. Accordingly, failure potential is dependent at least in part upon the peak and average temperatures reached by the oil. It is possible to reduce the possibility of break down by decreasing the operating temperature of the auxiliary system through the use of larger oil-fuel heat exchangers and by increasing oil-air heat exchanging. Obviously, the former is undesirable on an aircraft where space can be at a premium and weight is an important consideration, and the latter results in decreased engine efficiency. Conversely, the system could be operated at higher temperatures and engine efficiency could be increased if the frequency of service and, thus, complete oil replacement in the auxiliary system were increased. More frequent service would increase labor costs, however.

In contrast to the auxiliary oil system, the main oil system of a gas turbine engine is continuously monitored and serviced because some amount of engine oil is normally consumed during engine operation. Thus, unlike the closed circuit auxiliary oil system, the main engine oil system does not suffer from the previously mentioned deficiencies. While it may seem desirable to wed these systems, they presently cannot be joined during operation because particle contamination present in one system could damage the components serviced by the other system and, ultimately, could lead to an engine shutdown.

OBJECTS OF THE INVENTION

It is a principal object of the present invention to provide new and improved apparatus that is not subject to the foregoing disadvantages.

It is an object of the present invention to provide new and improved apparatus for automatically servicing a closed circuit fluid system.

It is another object of the present invention to decrease the creation of fluid sludge, the deterioration of fluid, and the depletion of fluid in a closed circuit fluid system.

It is a further object of the present invention to provide a device that automatically services a fluid system by transferring fluid thereto from another otherwise noncommunicating fluid systems.

It is yet another object of the present invention to enable the auxiliary oil system of a gas turbine engine to be operated at higher average and peak temperatures without need for scheduled auxiliary oil system changes, exceptionally large oil-fuel heat exchangers, or increased oil-air heat exchanging.

SUMMARY OF THE INVENTION

The foregoing objects of the present invention are achieved by providing apparatus for transferring a fluid between otherwise noncommunicating first and second fluid systems. The fluid transfer apparatus comprises first and second fluid flow paths. The first flow path includes a first entry port and a first exit port in flow communication respectively with the first and second fluid systems. The second flow path includes a second entry port and a second exit port in respective flow communication with the second and first fluid systems. An accumulator means in communication with the first flow path stores replacement fluid received from the first fluid system and selectively discharges the replacement fluid into the second fluid system. Second system overflow fluid returns to the first system via the second flow path. First and second filters respectively positioned in the first and second flow paths prevent contamination of one fluid system by the other. A plurality of selectively movable valve means disposed in the flow paths prevents free and reverse flow of fluid between the fluid systems and operate to allow fluid transfer only during a pre-selected time period.

A representative embodiment in accordance with the present invention that is suitable for use in a gas turbine engine provides for the accumulation and storage of oil from the main engine oil system while the engine is running and for discharging the oil into the auxiliary oil system after engine shutdown.

Those and other objects of the present invention, as well as further features and advantages thereof, will become apparent from reading the following detailed specification in conjunction with the accompanying drawings, all of which is intended to be typical of, rather than in any way limiting on, the scope of the appended claims. Where appropriate in the drawings, applicable references numerals have been carried forward.

DETAILED DESCRIPTION OF THE INVENTION

Figure 1:
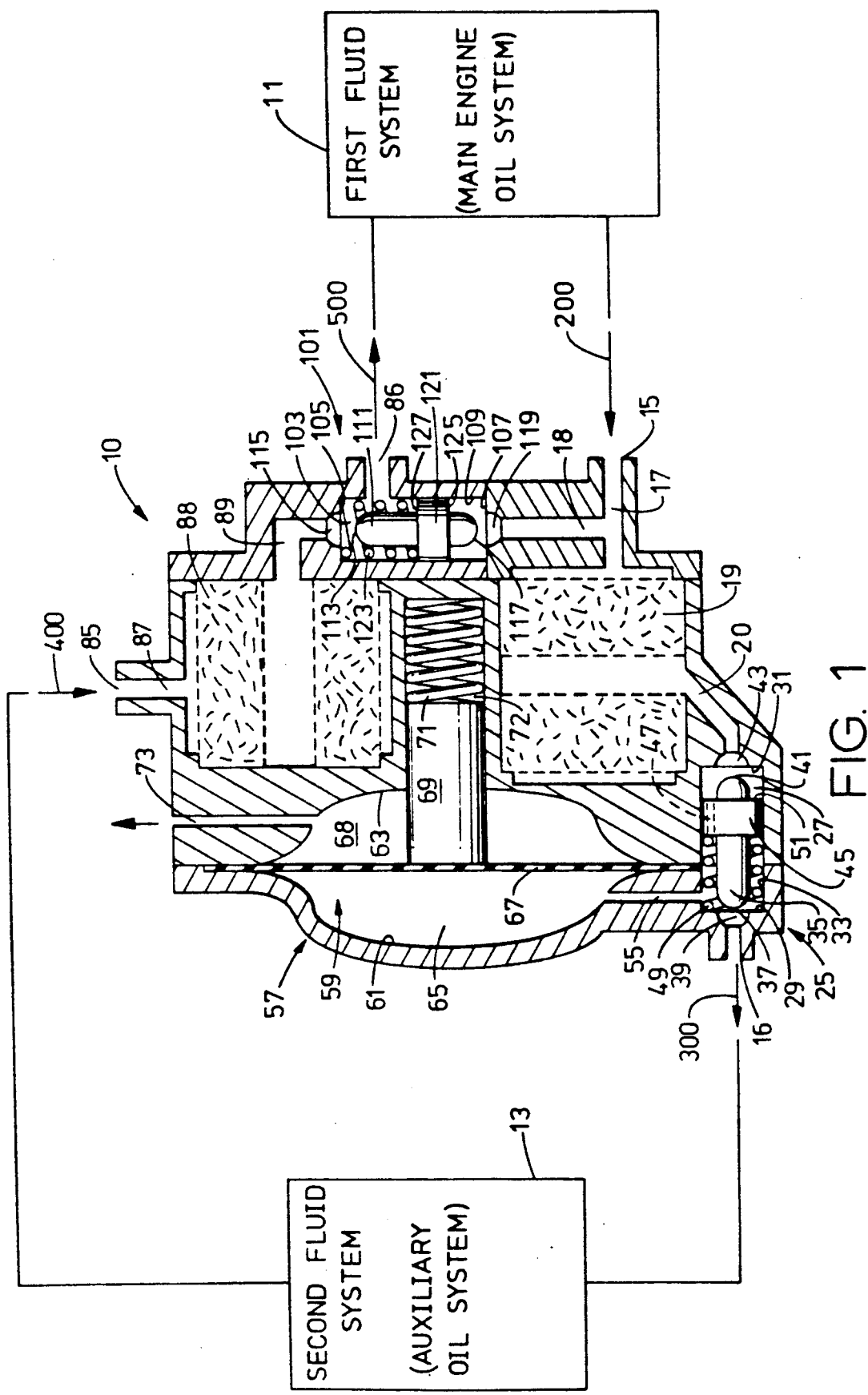
FIG. 1 depicts in cross section a representative embodiment in accordance with the present invention that may find application in an aircraft gas turbine engine.

FIG. 1 depicts in cross section a fluid transfer device 10 in accordance with the present invention that may find application, for example, in a gas turbine engine. Device 10 includes a first flow path 17 connecting a first entry port 15 and a first exit port 16 in respective flow communication with a first fluid system and a second closed fluid system, e.g., the main engine oil system and the auxiliary oil system, generally indicated by boxes 11 and 13, respectively. First flow path 17 includes an isolation subpath 18 to be discussed later. A first filter 19 for removal of particle contamination lies in first flow path 17 between first entry port 15 and a first intermediate subpath 20 of path 17. First intermediate subpath 20 connects first filter 19 to a first valve means 25.

First valve means 25 comprises a first valve chamber 27 and an elongate axially translatable first valve stem 35 disposed therein. First valve chamber 27 is defined by at least one sidewall 33 and a pair of end walls, 29 and 31. Sidewall 33 of first valve chamber 27 has a substantially cylindrical cross section, though other configurations are acceptable. A first valve rim 45 is integral with stem 35 and conforms to the configuration of sidewall 33. Rim 45 slidingly engages sidewall 33 and in cooperation therewith substantially prevents oil from passing thereby. First valve rim 45 further includes an orifice 47 that functions to permit oil to flow from the upstream side of rim 45 to the downstream side, as will be explained below.

First valve stem 35 is loaded on the downstream side by a first valve spring 49, which is shown in a state of partial compression. First valve stem 35 further includes a pair of valves, 37 and 41 positioned on opposite ends of valve stem 35. Each of the end walls, 29 and 31, include a valve seat, 39 and 43 respectively, that cooperates with a first valve, 37 and 41 respectively, to seal the first flow path in alternation. In other words, valve 37 seats upon valve seat 39, which forms a part of end wall 29. Similarly, valve 41 seats upon valve seat 43, which forms a part of end wall 31.

Fluid is accumulated and stored in an accumulator means 57, which communicates with first valve chamber 27 via an accumulator subpath 55. Accumulator means 57 includes an accumulator chamber 59 defined generally by a front wall 61 and a rear wall 63 which, as shown here in FIG. 1, are substantially configured as mirror image ellipsoid segments of one base, though other configurations are possible. Selectively secured within accumulator chamber 59 is a diaphragm 67. As shown in FIG. 1, diaphragm 67 is secured therein where front wall 61 joins rear wall 63 thereby dividing chamber 59 into a fluid receptacle 65 defined by front wall 61 and diaphragm 67 and into an air chamber 68 defined by rear wall 63 and diaphragm 67. The volume of receptacle 65 varies in relation to the position of diaphragm 67.

Still referring to FIG. 1, a diaphragm support 69, which is loaded by a diaphragm spring 71, also shown in a state of partial compression, mounts diaphragm 67. Spring 71, which is positioned within a recess 72, thereby provides for a reversible collapse of diaphragm 67 against accumulator rear wall 63 as receptacle 65 fills with fluid. An air vent 73 facilitates the collapse of diaphragm 67 against rear wall 63 as receptacle 65 fills with fluid by allowing air in air chamber 68 to be vented. Similarly, air vent 73 facilitates the action of spring 71 in returning diaphragm 67 to an uncollapsed position by allowing air to enter chamber 68.

Referring again to FIG. 1, device 10 further comprises a second flow path 87 for the transfer of overflow fluid from the second fluid system to the first fluid system. Path 87 includes a second entry port 85 and a second exit port 86, which are in respective flow communication with second fluid system 13 and first fluid system 11. A second filter 88 positioned in second flow path 87 filters fluid entering the device from the second fluid system prior to its being returned to the first fluid system.

Device 10 further includes a second valve means 101, which as shown in FIG. 1 is very similar to first valve means 25. Second valve means 101 comprises a second valve chamber 103 and an elongate axially translatable second valve stem 111 disposed therein. The second valve chamber is connected to a second intermediate subpath 89 of second flow path 87, which connects second filter 88 to second valve means 101; to isolation subpath 18; and to second exit port 86. Second valve chamber 103 is defined by at least one sidewall 109 and a pair of end walls, 105 and 107. Like sidewall 33 of first valve means 25, sidewall 109 preferably has a cylindrical configuration, though other shapes may be advantageously used in accordance with the present invention.

Second valve stem 111 includes a second valve rim 121 which is configured to conform to sidewall 109 and together therewith functions substantially to prevent fluid flow from one side of rim 121 to the other. End walls 105 and 107 of second valve chamber 103 define in part a pair valve seats 115 and 119 which respectively cooperate with a pair of valves 113 and 117 disposed on opposite ends of second valve stem 111 to open and close second flow path 87 and isolation subpath 18. Second valve stem 111 is loaded by a second valve spring 123, which is also shown in a state of partial compression.

In operation, e.g., when a gas turbine engine is running, fluid from the first fluid system 11, generally indicated by arrow 200, enters device 10 under pressure through entry port 15, thereby pressurizing first flow path 17 and isolation subpath 18. The pressurized fluid acts on a pressure surface 125 of second valve rim 121 and on valve 117, forcing second valve stem 111 to slide within chamber 103. Spring 123 is thereby compressed and valve 113 is seated on valve seat 115, thus closing off second flow path 87. In other words, flow communication between the fluid systems along second flow path 87 is prevented by the sealing engagement of valve 113 and valve seat 115.

The pressurized fluid flows on along first flow path 17, through first filter 19, intermediate subpath 20, and into first valve chamber 27. The pressurized fluid acts on a pressure surface 51 of first valve rim 45 and on valve 41, thereby compressing spring 49 until valve 37 seats on valve seat 39 and sealing first flow path 17. Thus, flow communication between the fluid systems along the first flow path is prevented by the seating of valve 37 onto valve seat 39. Or, in other words, valve 37 sealingly engages valve seat 39 such that fluid is stopped from passing further along the first flow path.

Thus, while pressure is maintained, e.g., while the turbine engine is running, the two systems remain isolated. That is, fluid flow from one system to the other is prevented by the closing of the valves in the first and second valve chambers. If the second system operates at a higher pressure than the first system, however, means to actuate the valves will be necessary to isolate the systems.

Referring again to the fluid flow through the embodiment of FIG. 1, even though fluid is prevented from passing into the second fluid system, fluid passes through orifice 47, into accumulator subpath 55, and from there enters fluid receptacle 65. Diaphragm 67 collapses against accumulator rear wall 63 under the pressure of the fluid as diaphragm support 69 correspondingly compresses spring 71. Air trapped in air chamber 68 is vented to the atmosphere through vent 73. When fluid receptacle 65 has completely filled with replacement fluid from the first system, fluid flow into the device essentially ceases.

Thus, by pressurizing the fluid systems, fluid from the first system is accumulated and stored within receptacle 65 of device 10. The fluid is retained within receptacle 65 until the fluid pressure ceases. Device 10 thus prevents direct unfiltered flow communication between the two systems, yet, by storing replacement fluid garnered from the first system, provides a means for the servicing of the second or closed fluid system.

When fluid pressure created by the first system ceases, e.g., at engine shutdown, springs 49, 71 and 123 each expand. In the first valve chamber 27, the expansion of spring 49 forces first valve stem 35 to move axially within chamber 27, thereby unseating valve 37 and seating valve 41 onto valve seat 43. Unseating valve 37 opens a path for fluid flow from fluid receptacle 65 into second fluid system 13, as shown in FIG. 1. Thus, stored fluid flows out of receptacle 65, through accumulator subpath 55, into and out of first valve chamber 27, and into the second fluid system via exit port 16, as indicated generally by arrow 300.

As valve 37 unseats, valve 41 sealingly engages valve seat 43 and in turn prevents a reverse flow of fluid from the second system to the first system via the first flow path 17. That is, even though reverse or back fluid flow through orifice 47 is possible, when valve 41 seats under the action of spring 49, first valve chamber 27 is cut off from first intermediate subpath 20 and the first flow path is thereby closed to a reverse fluid flow.

Within accumulator means 57, when fluid pressure ceases, spring 71 expands forcing diaphragm support 69 to return diaphragm 67 to its shutdown position. Fluid is thereby forced from fluid receptacle 65 by the movement of diaphragm 67 and enters the second fluid system as previously described.

Continuing to refer to the embodiment in FIG. 1 and the cessation of fluid pressure, the expansion of spring 123 in second valve chamber 103 causes second valve stem 111 to move axially within chamber 103. This movement unseats valve 113 and in turn seats valve 117 onto valve seat 119, thereby closing the isolation subpath 18 from the second valve chamber and opening the second flow path to fluid flow from the second to the first fluid system.

Second system overflow fluid, if any, returns to the device via a gravity flow as indicated generally by arrow 400, and enters device 10 via second entry port 85. The overflow fluid is filtered by filter 88, passes through second intermediate flow path 89 to second valve chamber 103, and subsequently exits the device via second exit port 86 as generally indicated by arrow 500. This overflow fluid is returned to the first fluid system. In the case of an aircraft gas turbine engine, the fluid, i.e., the oil, could be returned to the accessory gearbox, which is serviced by the main engine oil system.

The size of device 10 will depend upon the servicing needs of the second fluid system as well as constraints imposed by its intended installation location. For example, the auxiliary oil system of a gas turbine engine has a fluid capacity of approximately 330 cubic inches (about 5.4 liters). Replacement of auxiliary system oil at a rate as little as one percent of capacity for each engine start-up and shutdown will substantially prevent the occurrence of the previously mentioned problems. Thus, the fluid receptacle could be constructed to hold as little as 3.3 cubic inches (about 54 cm$^3$), and the rest of the device can be sized accordingly.

Figure 3:
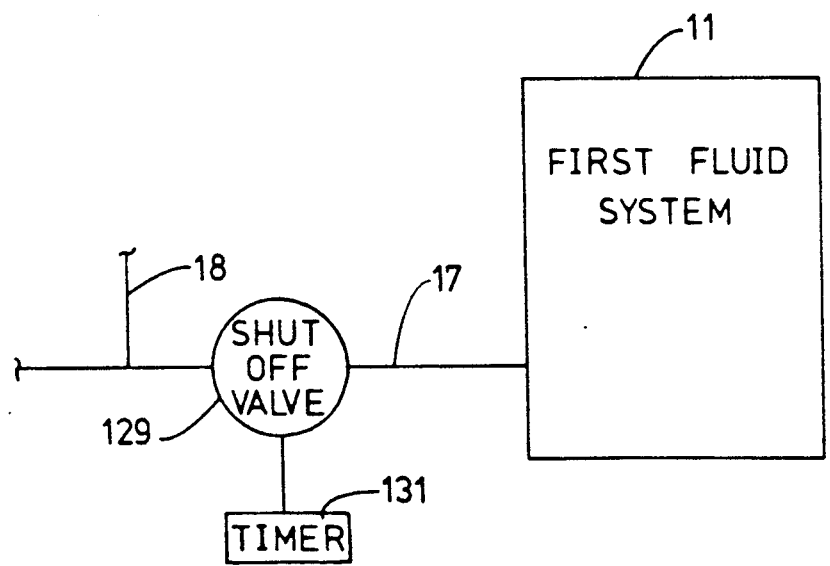
FIG. 3 illustrates in a partial schematic a variation of the invention depicted in FIG. 1.

For systems that operate for long periods of time between shutdowns, such as a turbine used for generating electricity, a shut-off valve 129 actuated by a timer 131 according to a predetermined schedule may be placed in the first flow path upstream of the isolation subpath as shown schematically in FIG. 3. The shut-off valve would operate to close first flow path 17, thereby causing a cessation in oil pressure and initiation of the oil replacement as previously described. Because the second fluid system would still be pressurized, however, means known in the art for creating a greater fluid pressure in the present invention than that existing in the second system would need to be supplied in order to effect the fluid transfer. That is, in this case, diaphragm spring 71 may need to be replaced with other actuation devices known in the art. In addition, to avoid overfills of the second fluid system and possible malfunctions thereof, sensing means known in the art for determining the fluid level of the second system would need to be provided so that the automatic fluid transfer would not occur if the second fluid system contained a predetermined amount of fluid. Such a shut-off valve could also find application in the present invention to accommodate start-up and shut-down pressure transients when fluid pressures do not exceed the actuation thresholds for the valves.

Figure 2:
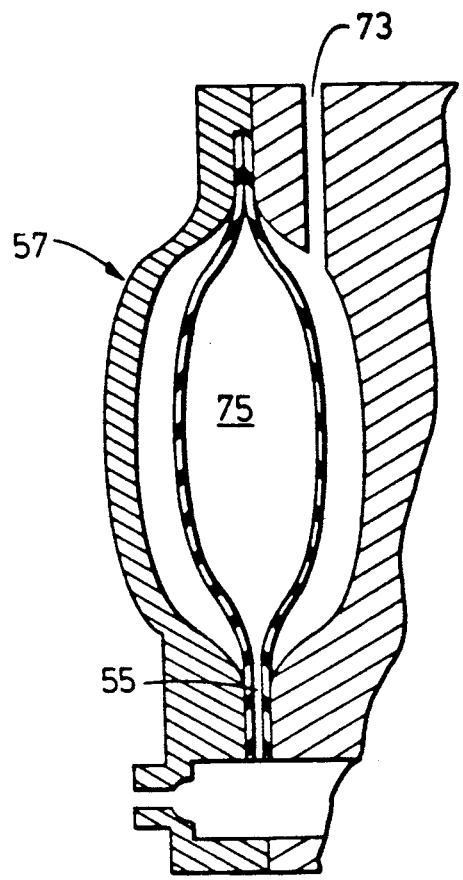
FIG. 2 depicts in partial cross section a variation of the invention depicted in FIG. 1.

An alternative to collapsible diaphragm 67 is shown in FIG. 2. As depicted in partial cross section an expandable bladder 75 is disposed in accumulator chamber 59 and is connected directly to accumulator subpath 55 for accumulation, storage and discharge of fluid. If such an alternative is used, fluid will fill bladder 75 against the pressure exerted by the walls of the bladder until the bladder walls rest on walls 61 and 63. Again, air will be vented from chamber 59 by vent 73. When fluid pressure from the first fluid system ceases, fluid will be forced from bladder 75 by its natural tendency to return to an unexpanded position. Bladder 75 must be selected to have sufficient "spring-back" in its walls to force the fluid from within. As will be familiar to those skilled in the art, further variations of accumulator means 57 known in the art would also serve in the present invention.

From the foregoing discussion, it will be apparent to those skilled in the art that various changes could be made in the present invention. For example, while one filter per flow path should be sufficient, more may be utilized within the scope and spirit of the present invention. In addition, while the present invention has been described in relation to its use in conjunction with the integrated-drive generator of a gas turbine engine, the present invention is not so limited. Thus, it could also find application in relation to the variable speed, constant frequency starter-generators planned for future gas turbine engines or as a fluid transfer device in relation to special gearboxes as between a gas turbine engine and a shaft-powered component such as a propeller, power generator, fluid pump, etc. Finally, it should be clear that the present invention is not limited to applications in gas turbine engines, that is, it should be realized that the present invention is capable of use between systems that use the same fluid. Such changes, modifications, substitutions and equivalents just suggested, as well as others that may now suggest themselves, all fall within the spirit and scope of the invention as defined by the appended claims.

What is claimed is:

1. A fluid transfer device for transferring fluid between a first and a second fluid system, said device comprising:
    a pair of fluid flow paths, each of said flow paths being in flow communication with the first and second fluid systems, the first fluid system being the main engine oil system of a gas turbine engine and the second fluid system being the auxiliary oil system of the gas turbine engine;
    accumulator means connected to one of said pair of flow paths for accumulating and storing fluid from the main engine oil system and for discharging the stored fluid into the auxiliary oil system; and
    at least one selectively movable valve means disposed along each flow path for controlling fluid flow between the first and second fluid systems, one of said movable valve means being selectively movable between a first position, to permit fluid to flow into said accumulator means, and a second position, to permit discharge of fluid from said accumulator means and into said second fluid system.

2. An oil transfer device for use in a gas turbine engine for periodically transferring replacement oil from a main engine oil system to an auxiliary oil system and for transferring overflow oil from the auxiliary oil system to the main engine oil system, said device comprising:
    (a) a first flow path for transferring replacement oil, said first flow path including a first entry port and a first exit port in respective flow communication with the main engine and auxiliary oil systems;
    (b) a second flow path for transferring overflow oil, said second flow path including a second entry port and a second exit port in respective flow communication with the auxiliary and main engine oil systems;
    (c) at least one oil filter respectively positioned in each of said flow paths;
    (d) accumulator means in flow communication with said first flow path, said accumulator means comprising means for accumulating and storing replacement oil received from the main engine oil system and for discharging replacement oil into the auxiliary oil system via said first flow path;
    (e) first selectively movable valve means disposed in said first flow path, said first valve means comprising means for preventing fluid flow in the downstream direction of said accumulator means while said accumulator means is accumulating and storing replacement fluid and for preventing fluid backflow in the upstream direction of said accumulator means at all other times; and
    (f) second selectively movable valve means disposed in said second flow path, said second valve means comprising means for preventing oil flow from the auxiliary oil system into the main engine oil system while said accumulator means is accumulating and storing the replacement oil.

3. The device of claim 2 wherein said accumulator means comprises a chamber having an expandable bladder disposed therein for accumulation, storage, and discharge of replacement oil.

4. The device of claim 2 wherein said accumulator means further comprises a chamber having a diaphragm selectively positionable therein.

5. The device of claim 2 wherein said first valve means comprises:

(a) a first valve chamber defined by at least one sidewall and a pair of end walls, each of said end walls including a valve seat; and
    (b) a translatable valve stem comprising a valve rim conforming to said sidewall and slideably engaging said sidewall and further comprising a pair of valves for sealingly engaging respective ones of said valve seats.

6. The device of claim 5 wherein said accumulator means comprises means for flow communication with said first flow path on said downstream side of said valve rim, said valve rim including an orifice for allowing oil flow through said valve rim.

7. The device of claim 2 wherein said second valve means comprises:
    (a) a second valve chamber defined by at least one sidewall and first and second end walls in respective communication with said first and second fluid systems, each of said end walls including a valve seat; and
    (b) a translatable valve stem having a valve rim conforming to said sidewall and slideably engaging said side wall and further comprising a pair of valves for sealingly engaging respective ones of said valve seats.

8. The device of claim 2 wherein said accumulator means comprises means for accumulating and storing replacement oil during engine operation and wherein the transfer of replacement and overflow oil occurs during engine shutdown.

9. The device of claim 1, further comprising means for forcing any stored fluid from said accumulator means into the auxiliary oil system when said one movable valve means is in said second position.

10. The device of claim 1, wherein said accumulator means comprises:
    a diaphragm; and
    biasing means connected to said diaphragm for forcing fluid out of said accumulator means and into the second fluid system when said one movable valve means is in said second position.

11. The device of claim 1, wherein said accumulator means comprises an expandable bladder to force any stored fluid from said accumulator means into the second fluid system when said one movable valve means is in said second position.

12. The device of claim 1, wherein said one movable valve means comprise:
    a valve chamber;
    a valve stem;
    a valve rim integrally formed with said valve stem and slidably engaging an interior wall of said valve chamber, said valve rim having at least one orifice formed therein to permit fluid to flow from the first fluid system to said accumulator means when said one valve means is in said first position; and
    biasing means for selectively moving said one valve means to said second position, responsive to a loss of fluid pressure in said one of said pair of flow paths.

13. The device of claim 1, further comprising at least one fluid filter selectively disposed along each flow path.

14. An oil transfer device for use in a gas turbine engine for periodically transferring replacement oil from a main engine oil system to an auxiliary oil system and for transferring overflow oil from the auxiliary oil system to the main engine oil system, said device comprising:
- (a) a first flow path for transferring replacement oil from the main engine system to the auxiliary oil system;
- (b) a second flow path for transferring overflow oil from the auxiliary oil system to the main engine oil system;
- (c) accumulator means, connected to said first flow path, for accumulating and storing replacement oil received from the main engine oil system and for discharging replacement oil into the auxiliary oil system;
- (d) valve means disposed in said first flow path for controlling the transfer of replacement oil between the main engine oil system and the auxiliary oil system, said valve means being selectively movable between a first position, to permit fluid to flow into said accumulator means, and a second position, to permit discharge of fluid from said accumulator means and into the auxiliary oil system.

15. The device of claim 14, further comprising means for forcing any stored fluid from said accumulator means into the auxiliary oil system when said valve means is in said second position.

16. The device of claim 14, wherein said accumulator means comprises:
- a diaphragm; and
- biasing means connected to said diaphragm for forcing fluid out of said accumulator means and into the auxiliary oil system when said valve means is in said second position.

17. The device of claim 14, wherein said accumulator means comprise an expandable bladder to force any stored fluid from said accumulator means into the auxiliary oil system when said valve means is in said second position.

18. The device of claim 14, wherein said valve means comprises:
- a valve chamber;
- a valve stem;
- a valve rim integrally formed with said valve stem and slidably engaging an interior wall of said valve chamber, said valve rim having at least one orifice formed therein to permit fluid to flow from the main engine oil system to said accumulator means when said one valve means is in said first position; and
- biasing means for selectively moving said valve stem to said second position, responsive to a loss of fluid pressure in said first flow path.

* * * * *